(12) United States Patent
Benisty

(10) Patent No.: US 10,466,906 B2
(45) Date of Patent: Nov. 5, 2019

(54) ACCESSING NON-VOLATILE MEMORY EXPRESS CONTROLLER MEMORY MANAGER

(71) Applicant: Western Digital Technologies, Inc., San Jose, CA (US)

(72) Inventor: Shay Benisty, Beer Sheva (IL)

(73) Assignee: WESTERN DIGITAL TECHNOLOGIES, Inc., San Jose, CA (US)

(*) Notice: Subject to any disclaimer, the term of this patent is extended or adjusted under 35 U.S.C. 154(b) by 44 days.

(21) Appl. No.: 15/846,787

(22) Filed: Dec. 19, 2017

(65) Prior Publication Data

US 2019/0187894 A1 Jun. 20, 2019

(51) Int. Cl.
*G06F 3/06* (2006.01)
*G06F 12/128* (2016.01)
*G06F 13/16* (2006.01)
*G06F 13/42* (2006.01)

(52) U.S. Cl.
CPC .............. *G06F 3/061* (2013.01); *G06F 3/065* (2013.01); *G06F 3/0659* (2013.01); *G06F 3/0679* (2013.01); *G06F 12/128* (2013.01); *G06F 13/1668* (2013.01); *G06F 13/4282* (2013.01); *G06F 13/4295* (2013.01); *G06F 2212/621* (2013.01); *G06F 2213/0026* (2013.01)

(58) Field of Classification Search
CPC ........ G06F 3/061; G06F 3/065; G06F 3/0659; G06F 3/0679; G06F 12/128; G06F 13/1668; G06F 13/4282; G06F 13/4295; G06F 2212/621; G06F 2213/0026
See application file for complete search history.

(56) References Cited

U.S. PATENT DOCUMENTS

2016/0342545 A1* 11/2016 Arai ...................... G06F 3/0659
2018/0285073 A1* 10/2018 Fukuchi ................ G06F 3/0659

* cited by examiner

*Primary Examiner* — Aracelis Ruiz
(74) *Attorney, Agent, or Firm* — Patterson & Sheridan, LLP; Steven H. Versteeg

(57) ABSTRACT

Embodiments of the present disclosure generally relate to an NVMe storage device having a controller memory manager and a method of accessing an NVMe storage device having a controller memory manager. In one embodiment, a storage device comprises a non-volatile memory, a volatile memory, and a controller memory manager. The controller memory manager is operable to store one or more NVMe data structures within the non-volatile memory and the volatile memory.

6 Claims, 7 Drawing Sheets

ACCESSING NON-VOLATILE MEMORY EXPRESS CONTROLLER MEMORY MANAGER

BACKGROUND OF THE DISCLOSURE

Field of the Disclosure

Embodiments of the present disclosure generally relate to a NVMe storage device having a controller memory manager and a method of accessing a NVMe storage device having a controller memory manager.

Description of the Related Art

NVM Express (NVMe) is an interface protocol between a host and a storage device, such as a solid state drive (SSD), for accessing data stored in the storage device. The NVMe protocol is based on a paired submission queue and completion queue mechanism. Commands, such as read commands and write commands, are placed by host software into a submission queue and are fetched by the storage device for execution. Completions are placed into the associated completion queue by storage device controller to notify the host of completion of the commands.

In general, submission queues and completion queues are allocated in host memory, such as in host DRAM. The NVMe protocol has introduced a controller memory buffer (CMB) feature that enables NVMe data structures, such as submission queues, completion queues, PRP lists, SGL segments, and data buffers to be stored in controller memory, such as in storage device DRAM.

However, current NVMe storage device with the CMB feature provide high performance but have a small storage capacity. Therefore, an improved NVMe storage device providing CMB capability is needed.

SUMMARY OF THE DISCLOSURE

Embodiments of the present disclosure generally relate to a NVMe storage device having a controller memory manager and a method of accessing a NVMe storage device having a controller memory manager.

In one embodiment, a storage device comprises a non-volatile memory, a volatile memory, and a controller memory manager means. The controller memory manager means is operable to store one or more NVMe data structures within the non-volatile memory and the volatile memory.

In one embodiment, a method of accessing a storage device comprises receiving a host write transaction to a controller memory space containing one or more NVMe queues. If an address of the host write transaction falls into the NVMe queues, then the host write transaction is classified as a NVMe queue access. If the host write transaction is associated with a long burst is determined, then the host write transaction is classified as a NVMe data buffer access. If the host write transaction is associated with a short data burst, then the host write transaction is classified as a pointer access.

In another embodiment, a method of accessing NVMe queues to access a storage device comprises storing a NVMe queue in a DRAM of the storage device. An SRAM of the storage device is utilized as a cache to the NVMe queue.

In yet another embodiment, a method of accessing a storage device, comprises receiving a host write transaction classified as a NVMe data buffer access. If the host write transaction is directed to a persistent memory region (PMR) of the storage device is determined, then a duplicate copy of the host write transaction is stored to a non-volatile memory of the storage device in a background operation.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

Embodiments of the present disclosure generally relate to a NVMe storage device having a controller memory manager and a method of accessing a NVMe storage device having a controller memory manager.

Figure 1:
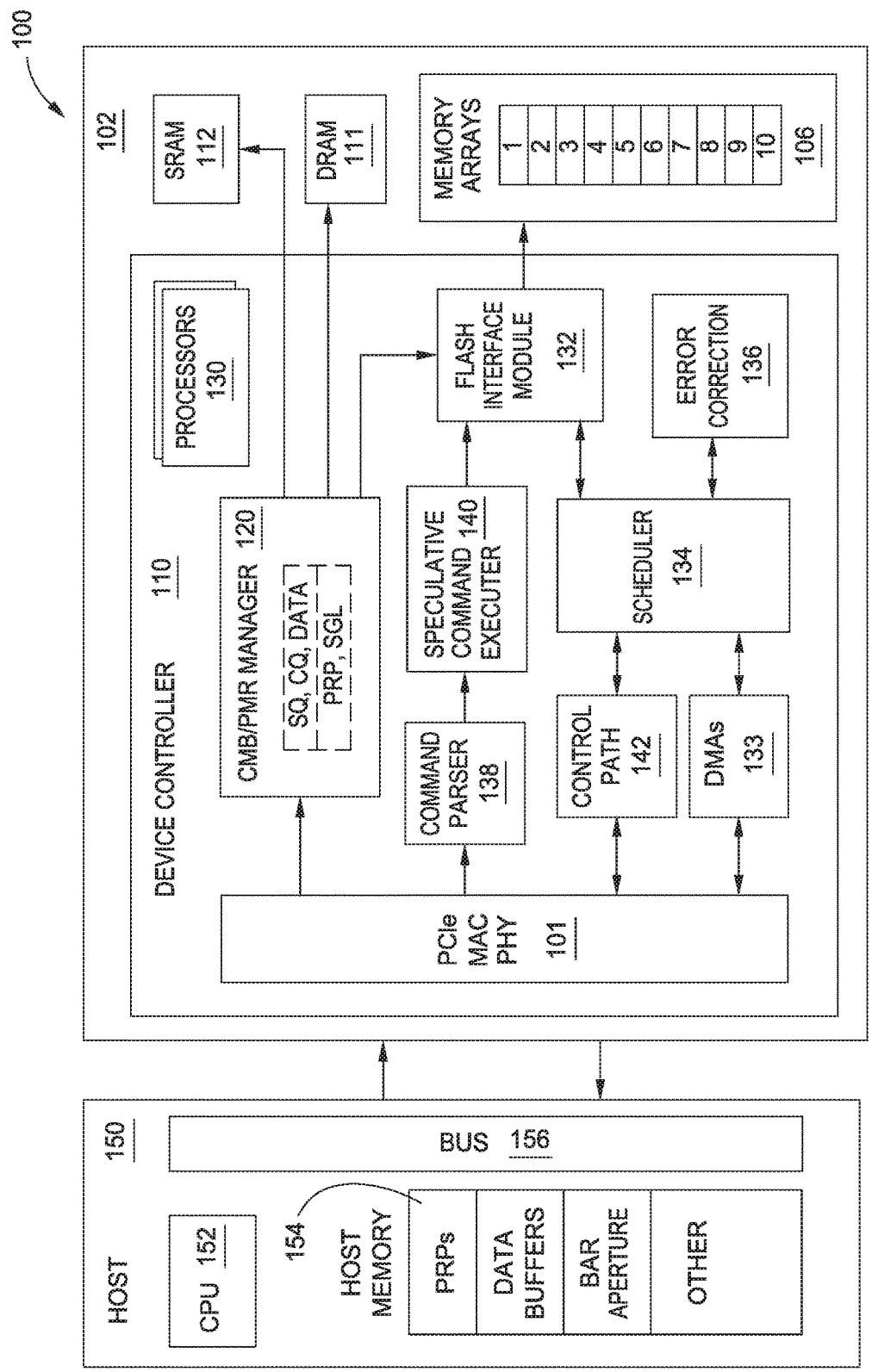
FIG. 1 is a schematic illustration of one embodiment of a system including a host and a storage device.

FIG. 1 is a schematic illustration of one embodiment of a system 100 including an initiator or host 150 and a storage device 102, such as a solid state drive (SSD), for host 150. Host 150 may utilize a non-volatile memory (NVM) 106 included in storage device 102 to write and to read data, such as for long term memory storage. Storage device 102 may be an internal storage drive, such as a notebook hard drive or a desktop hard drive. Storage device 102 may be a removable mass storage device, such as, but not limited to, a handheld, removable memory device, such as a memory card (e.g., a secure digital (SD) card, a micro secure digital (micro-SD) card, or a multimedia card (MMC)) or a universal serial bus (USB) device. NVM device 102 may take the form of an embedded mass storage device, such as an eSD/eMMC embedded flash drive, embedded in host 150. Storage device 102 may also be any other type of internal storage device, removable storage device, embedded storage device, external storage device, or network storage device.

Host 150 may include a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving). In certain embodiments, host 150 includes any device having a processing unit or any form of hardware capable of processing data, including a general purpose processing unit, dedicated hardware (such as an application specific integrated circuit (ASIC)), configurable hardware such as a field programmable gate array (FPGA), or any other form of processing unit configured by software instructions, microcode, or firmware.

Host 150 includes a central processing unit (CPU) 152 connected to a host memory space 154, such as DRAM or other main memories. An application program may be stored to memory space 154 for execution by components of host 150.

Host 150 includes a bus 156, such as a storage device interface, which interacts with a host interface 101, which may include mac and phy components, of storage device 102 for ingress of communications from host 150 to storage device 102 and egress of communications from storage device 102 to host 150. Bus 156 and host interface 101 operate under a communication protocol, such as a Peripheral Component Interface Express (PCIe) serial communication protocol or other suitable communication protocols. Other suitable communication protocols include ethernet, serial attached SCSI (SAS), serial AT attachment (SATA), any protocol related to remote direct memory access (RDMA) such as Infiniband, iWARP, or RDMA over Converged Ethernet (RoCE), and other suitable serial communication protocols. NVM device 102 may also be connected to host 150 through a switch or a bridge.

NVM 106 of storage device 102 may be configured for long-term storage of information as non-volatile memory space and retains information after power on/off cycles. NVM 106 may consist of one of more dies of NAND flash memory. Other examples of non-volatile memory include phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in storage device 102. Each platter may contain one or more regions of one or more tracks of data. NVM 106 may include one or more types of non-volatile memory.

Storage device 102 includes a controller 110 which manages operations of storage device 102, such as writes to and reads from NVM 106. Controller 110 may include one or more processors 130, which may be multi-core processors. Processor 130 handles the components of NVM device 102 through firmware code.

Controller 110 may operate under NVM Express (NVMe) protocol, but other protocols are applicable. NVMe protocol is a communications interface/protocol developed for SSDs to operate over a host and storage device linked over a PCIe interface. NVMe protocol provides a command queue and completion path for access of data stored in storage device 102 by host 150.

Controller 110 also includes a controller buffer manager 120. Controller buffer manger 120 is connected to a dynamic random access memory (DRAM) 111, to a static random access memory (SRAM) 112, and to NVM 106 through a flash interface module 132. DRAM 111 and SRAM 112 are volatile memories or cache buffer(s) for short-term storage or temporary memory during operation of storage device 102. Volatile memories do not retain stored data if powered off. DRAM requires periodic refreshing of stored data while SRAM does not require refreshing. SRAM provides faster access to data but is more expensive than DRAM.

Controller 110 executes computer-readable program code (e.g., software or firmware) executable instructions (herein referred to as "instructions"). The instructions may be executed by various components of controller 110, such as processor 130, logic gates, switches, application specific integrated circuits (ASICs), programmable logic controllers, embedded microcontrollers, and other components of controller 110.

The instructions are stored in a non-transitory computer readable storage medium. In certain embodiment, the instructions are stored in a non-transitory computer readable storage medium of storage device 102, such as in a read-only memory or NVM 106. Instructions stored in storage device 102 may be executed without added input or directions from host 150. In other embodiments, the instructions are transmitted from host 150. The controller 110 is configured with hardware and instructions to perform the various functions described herein and shown in the figures.

Storage device 102 may also include other components, such as flash interface module 132, a direct memory access DMA module 133, a scheduler 134, an error correction module 136, a command parser 138, a command executor 140, and a control path 142. Flash interface module 132 interacts with NVM 102 for read and write operations. DMA module 133 executes data transfers between host 150 and storage device 102 without involvement from CPU 152. Scheduler 134 controls the data transfer while activating the control path for fetching physical page regions (PRPs), posting completion and interrupts, and activating the DMAs for the actual data transfer between host 150 and storage device 102. Error correction module 136 corrects the data fetched from the memory arrays. Command parser 138 parses commands to command executor 140 for execution on flash interface module 132.

Figure 2:
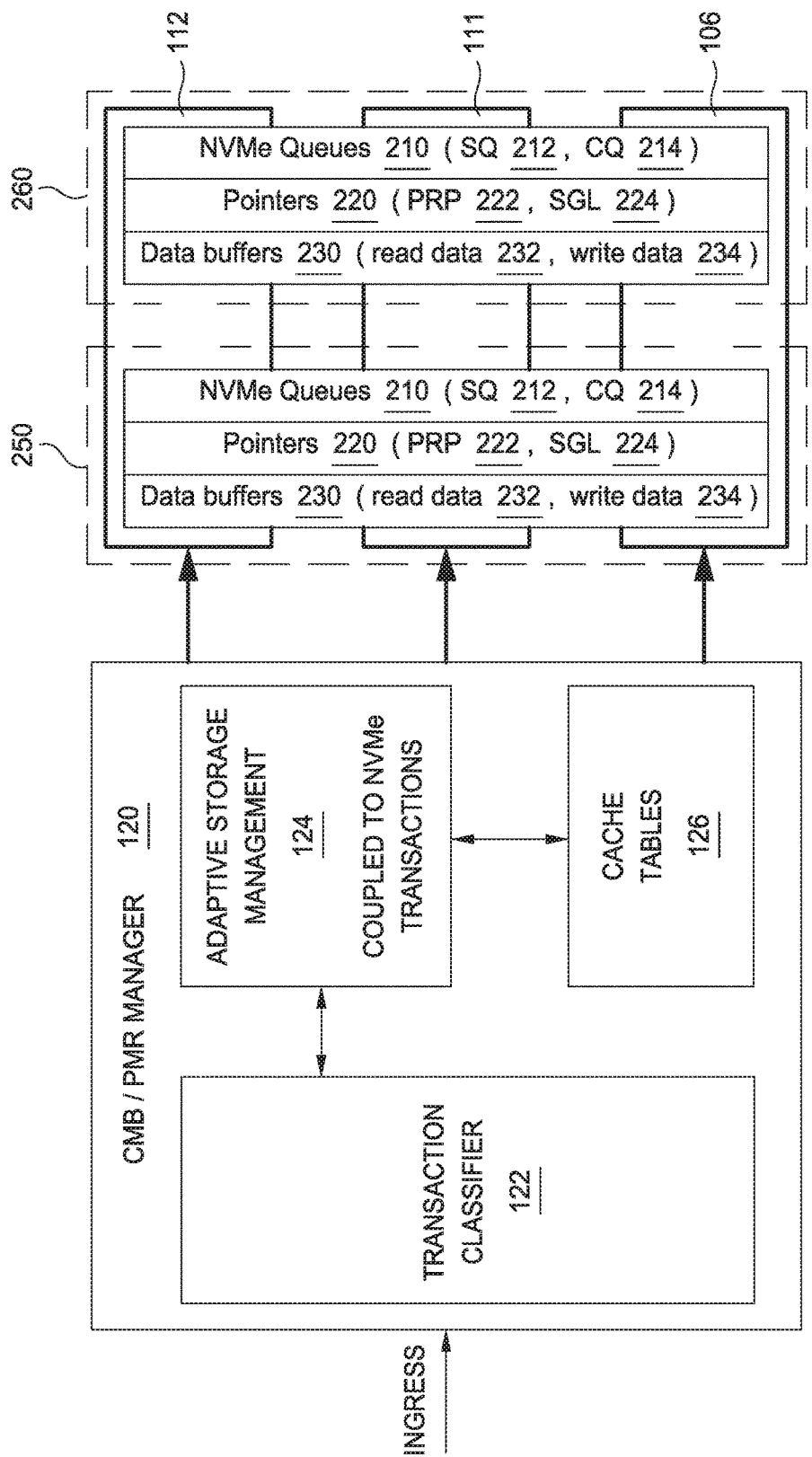
FIG. 2 is a schematic diagram illustrating of one embodiment of a controller buffer manager of a storage device.

FIG. 2 is a schematic diagram illustrating of one embodiment of controller buffer manager 120 of system 100 of FIG. 1, but other systems are possible. Controller buffer manager 120 manages data transactions between host 150 and storage device 102 having a controller memory buffer (CMB) 250 and/or a persistent memory region (PMR) 260. CMB 250 and PMR 260 are controller memory spaces which may span across DRAM 111, SRAM 112, and/or NVM 106 (i.e., spanning across one, two, or all three memories). The contents in CMB 250 typically do not persist across power cycles and resets while the contents in PMR 260 persist across power cycles and resets. CMB 250 and PMR 260 have similar functions. However, the contents in PMR 260 persist across power cycles and resets and require storing in NVM 106.

One or more types of data structures defined by the NVMe protocol may be stored in CMB 250 and/or PMR 260 by controller buffer manager 120 or may be stored in host memory space 154. Host 150 may initialize CMB 250 and PMR 260 prior to controller buffer manager 120 storing NVME data structures thereto. At initialization phase, storage device 102 may advertise to host 150 the capability and the size of CMB/PMR 250, 260 and may advertise which NVMe data structures may be stored into CMB/PMR 250, 260. For example, storage device 102 may store one or more of the NVMe data structures into CMB/PMR 250, 260, such as submission queues 212, completion queues 214, PRP lists 222, SGL segments 224, write data 234, read data 232, and combinations thereof.

Controller buffer manager 120 may include a transaction classifier module 122 to classify received host write transactions to CMB/PMR 250, 260. Host write transactions to CMB/PMR 250, 260 may be associated with host write command and host read commands.

In certain embodiments, transaction classifier module 122 may classify the host write transactions into one of the three NVM data structure groups of NVMe queues 210, pointers 220, and data buffers 230. NVMe queues 210 include host submission queues (SQ) 212 and host completion queues (CQ) 214. Pointers 220 may include physical region pages (PRP) lists 222 and scatter gather list (SGL) segments 224. PRP lists 222 contain pointers indicating physical memory pages populated with user data or going to be populated with user data, such as for read or write commands in NVMe queues. SGL segments 224 include pointers indicating the physical addresses of host memory space 154 in which data should be transferred from for write commands and in which data should be transferred to for read commands. Data buffers 230 may contain write data 234 to be written to NVM 106 associated with a write command contain and/or read data 232 from storage device 102 associated with a read command.

In certain embodiments, NVMe queues 210, pointers 220, and data buffers 230 associated with a particular command may be implemented into CMB 250 and/or PMR 260 by controller buffer manager 120 to reduce command execution latency by storage device 102. For example, a host command entry written to SQs 212 implemented CMB/PMR 250, 260 avoids fetching of the host command entry through the PCIe fabric which may include multiple switches if the SQ is located in host memory space. PRP lists 222 and SGL segments 224 written to CMB/PMR 250, 260 of storage device 102 avoids a separate fetch of the PRP lists 222 and SGL segments 224 through the PCIe fabric if the PRP lists and SGL segments are located in host memory space. Write data 234 written to CMB/PMR 250, 260 of storage device 102 avoid having storage device 102 fetch the write data from host memory space.

Controller buffer manager 120 may include an adaptive storage management module 124 to determine where to store the classified host write transactions within CMB/PMR 250, 260, such as whether to store the host write transaction in SRAM 112, DRAM 111, NVM 106 or combinations thereof. Where to store the host write transaction may be based on the available resources in the various storage types along with the type of the NVMe structure classification. For example, adaptive storage management module 124 may determine the available resource or the state of SRAM 112, such as whether SRAM 112 is full, almost fully, almost empty, empty, etc. Based upon whether there is available space in SRAM 112 and type of NVMe data structure classification, adaptive storage management module 124 may store the host write transaction into SRAM 112, DRAM 111, NVM 106, or combinations thereof (i.e., data stored in two or more types of memories). Adaptive storage management module 124 may utilize one or more cache tables 126 to record where the where the host write transaction is stored.

Figure 3:
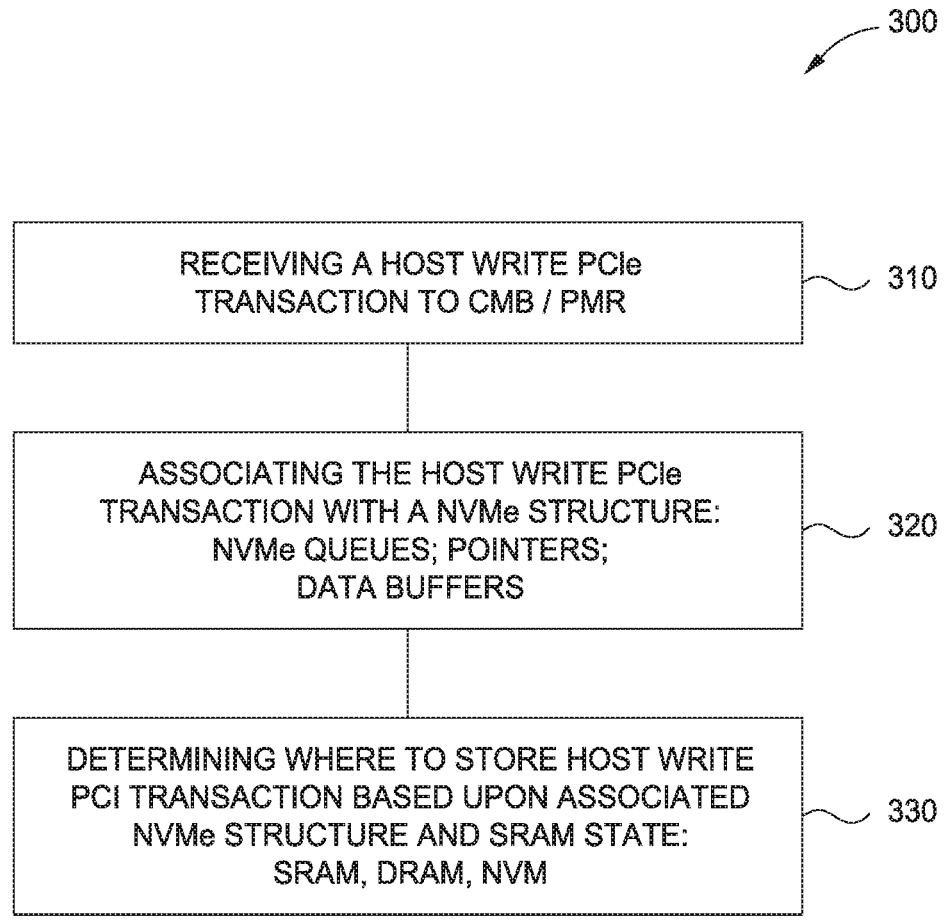
FIG. 3 is a schematic diagram illustrating one embodiment of a method of processing host write transactions to CMB/PMR to access a storage device.

FIG. 3 is a schematic diagram illustrating one embodiment of a method 300 of processing host write transactions to CMB/PMR 250, 260 to access storage device 102. Method 300 will be described in reference to storage device 102 of FIG. 1 and controller buffer manager 120 of FIG. 2 although other systems and controller buffer managers may be utilized.

At process 310, a host write PCIe transaction from host 150 directed to CMB 250 or PMR 260 is received by controller buffer manager 120 of storage device 102. The host write PCIe transaction may be associated with a read command or a write command.

At process 320, controller buffer manager 120 associates the transaction of process 310 with a NVMe structure, such as related to NVMe queues 210, pointers 220, or data buffers 230.

At process 330, controller buffer manager 120 determines the state of SRAM 112, such as the available space for additional data to be stored to SRAM 112. Based upon the associated NVMe data structure of the host write PCIe transaction at process 320 and based upon the state of the SRAM 112, controller buffer manager 120 determines where to store the received host write transaction. The host write transaction may be stored in SRAM 112, DRAM 111, NVM, 106, or any combination of thereof.

In certain embodiments, method 300 provides a controller buffer manager 120 for a storage device with a large capacity CMB/PMR without the need to increase an ASIC area. In certain embodiments, method 300 provides a controller buffer manager with a large capacity CMB/PMR with similar or better performance than a CMB/PMR consisting of DRAM memory space alone.

Figure 4:
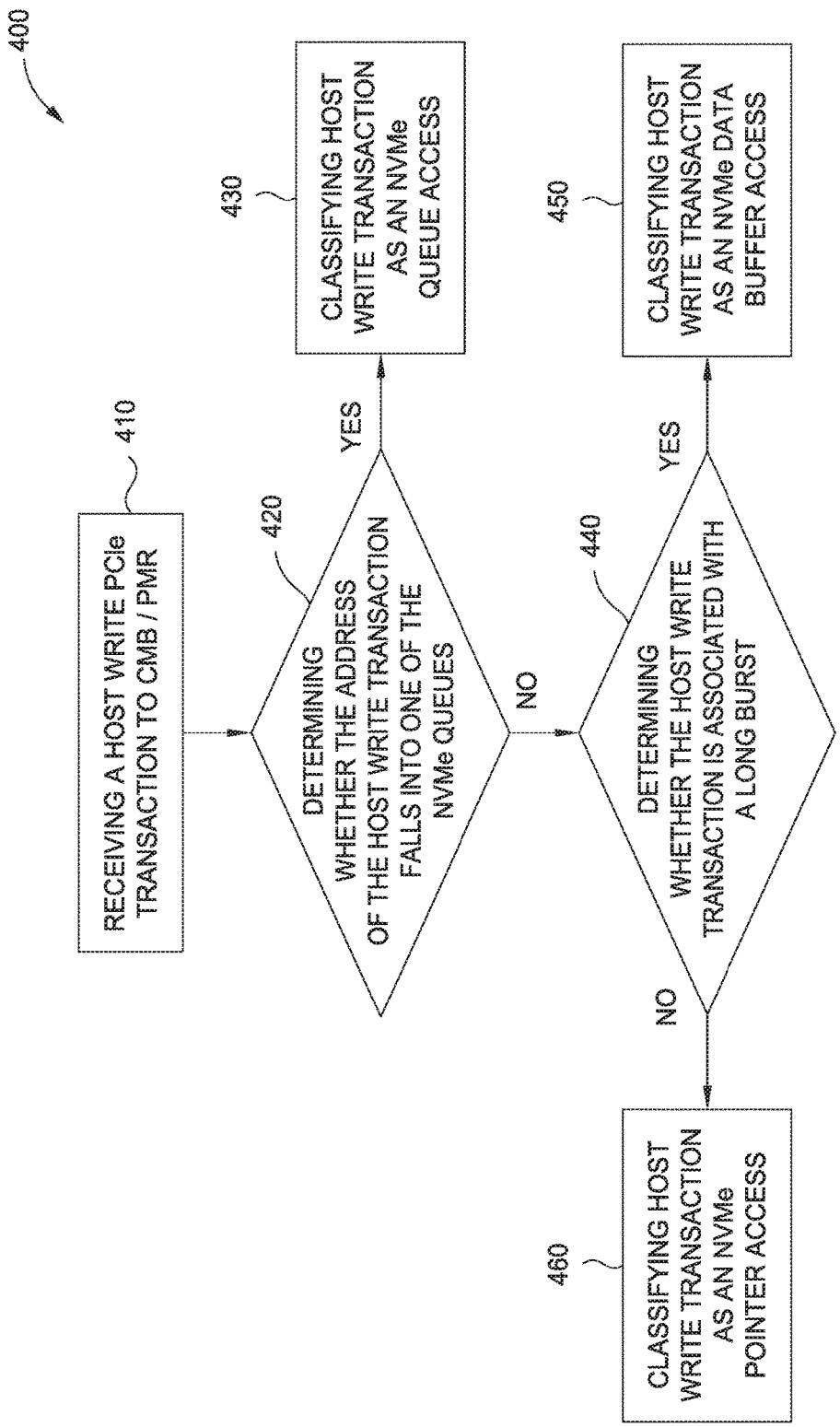
FIG. 4 is a schematic diagram illustrating another embodiment of a method of processing host write transactions to CMB/PMR to access a storage device.

FIG. 4 is a schematic diagram illustrating another embodiment of a method 400 of processing host write transactions to CMB/PMR 250, 260 to access storage device 102. Method 400 will be described in reference to storage device 102 of FIG. 1 and controller buffer manager 120 of FIG. 2 although other systems and controller buffer managers may be utilized.

At process 410, a host write PCIe transaction from host 150 directed to CMB 250 or PMR 260 is received by controller buffer manager 120 of storage device 102. The host write PCIe transaction may be associated with a read command or a write command.

At process 420, controller buffer manager 120 determines whether the address of the host write transaction falls into one of NVMe queues 210. If the address does fall into one of NVMe queues 210, then controller buffer manager 120 classifies the host write transaction as a NVMe queue access at process 430. If the address does not fall into one of NVMe queues 210, controller buffer manager 120 proceeds to process 440.

At process 440, controller buffer manager 120 determines whether the host write transaction is a long burst. If the host write transaction is a long burst, then the host write transaction is classified as a NVMe data buffer access at process 450. Controller buffer manager 120 infers that the host write transaction involves writes to data buffers 230. For example, a host transaction of write data to is typically large in size.

If the host write transaction is a short burst, then host write transaction is classified as pointer access at process 460. Controller buffer manager 120 infers that the host write transaction involves writes to pointers 220 since pointers are typically small in size.

In certain embodiments, method 400 provides a data buffer manger 120 that efficiently classifies CMB/PMR transactions with one of the NVMe data structures. A CMB/PMR transaction may be first classified as NVMe queue access based upon the address of the CMB/PMR transactions and then classified into data buffers or pointers based upon the size of the CMB/PMR transaction.

Figure 5:
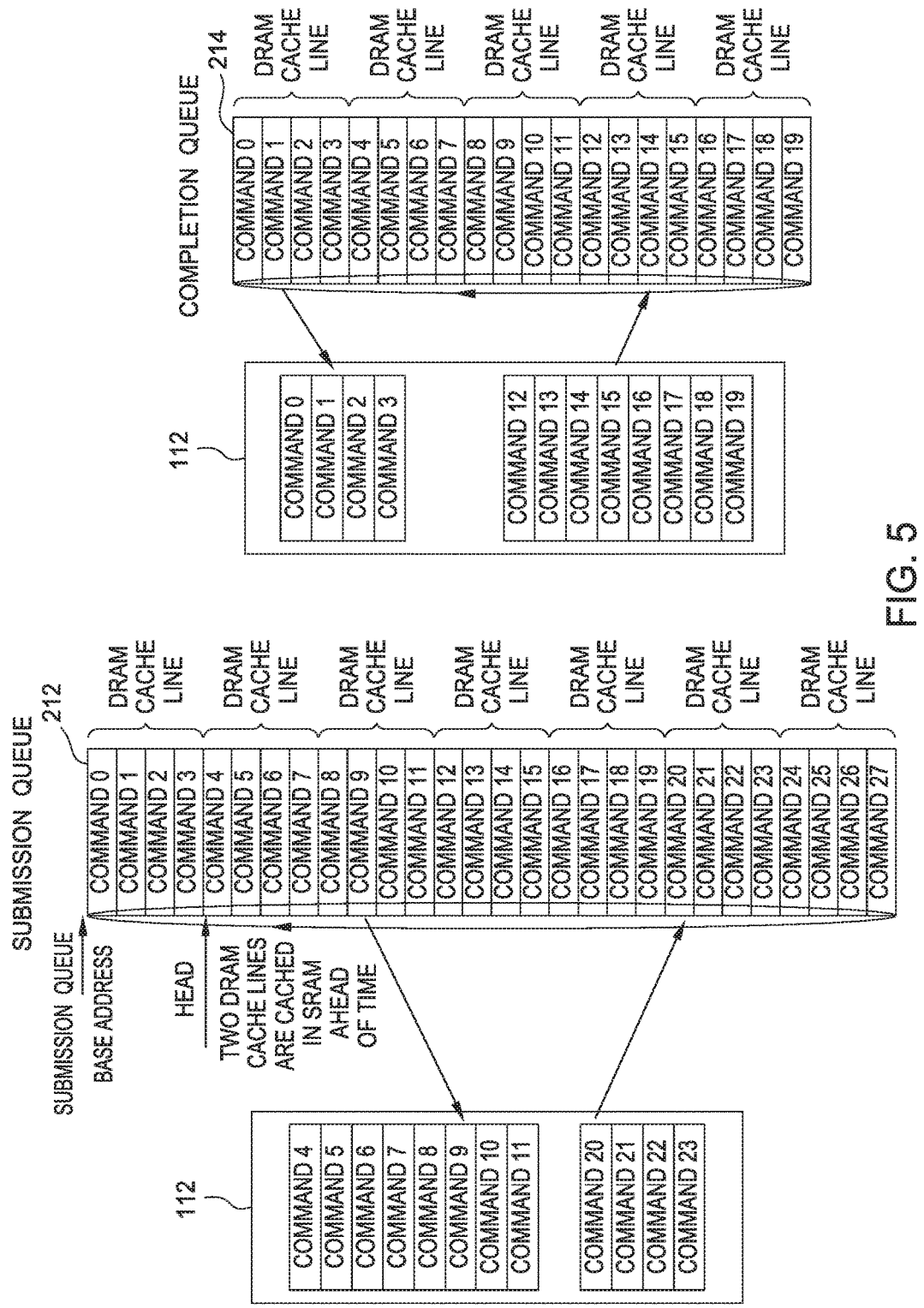
FIG. 5 is a schematic diagram illustrating one embodiment of accessing NVMe queues to access a storage device.

FIG. 5 is a schematic diagram illustrating one embodiment of accessing NVMe queues, such as SQ 212 and CQ 214 of FIG. 2, to access the storage device 102, although other SQs and CQs are possible. Accessing NVMe queues will be described in reference to storage device 102 of FIG. 1 and controller buffer manager 120 of FIG. 2 although other systems and controller buffer managers may be utilized.

SQ 212 and CQ 214 are located in DRAM 111. As shown in FIG. 5, SQ 212 may be filled contiguously with twenty-eight command entries and the size of CQ 214 may be filled contiguously with twenty command entries, although the size of SQ and CQ may be any desired size.

In one embodiment, controller buffer manager 120 temporarily stores a plurality of received host commands in SRAM 112. After a plurality of received host commands are stored and aggregated in SRAM 112 to fill one or more full DRAM cache lines, controller buffer manager 120 flushes the plurality of host command entries to DRAM 111 to the tail pointer of SQ 212 pointing to command slot 20. Writing a full cache line to DRAM 111 avoids inefficient partial read-modify write operations.

In one embodiment, controller buffer manager 120 fetches two or more DRAM cache lines from the head of the SQ 212, such as command 4 through command 11 from SQ 212 as indicated by a head pointer pointing to command 4. The two DRAM cache lines are cached in SRAM 112 for more rapid execution of the commands by storage device 102. When the head pointer points to command 8 in SQ 212, commands 4 through command 7 in SRAM 112 are deleted and commands 12 through 15 are fetched from SQ 212 and cached in SRAM 112. Storage device 102 performance is increased since device controller 110 fetches commands for execution from SRAM 112 and not from DRAM 111. Having at least two DRAM cache lines from the head of SQ 212 helps to ensure that commands will be sitting in SRAM 112 for fetching and for execution by storage device 102.

In one embodiment, controller buffer manager 120 temporarily stores a plurality of completion command entries in SRAM 112. After a plurality of completion command entries are stored and aggregated in SRAM 112 to fill one DRAM cache line, controller buffer manager 120 flushes the plurality of completion command entries to DRAM of host memory 154 to the head pointer of CQ 214 pointing to command 0.

In one embodiment, controller buffer manager 120 fetches two or more DRAM cache lines from the tail of the CQ 214 such as command 12 through command 19 as indicated by a tail pointer pointing to command 12. Two or more full DRAM cache lines are cached in SRAM 112 for more rapid fetching of completion entries for writing of completion entries to CQ 214.

Utilizing SRAM 112 as a temporary cache for SQ 212 and CQ 214 stored in DRAM 111 may provide a controller buffer manger 120 with higher performance since the commands may cached in SRAM 112 in advance for access by storage device 102 or host 150 or may be cached in SRAM 112 for aggregation into a full DRAM cache line before writing to DRAM 111.

Figure 6:
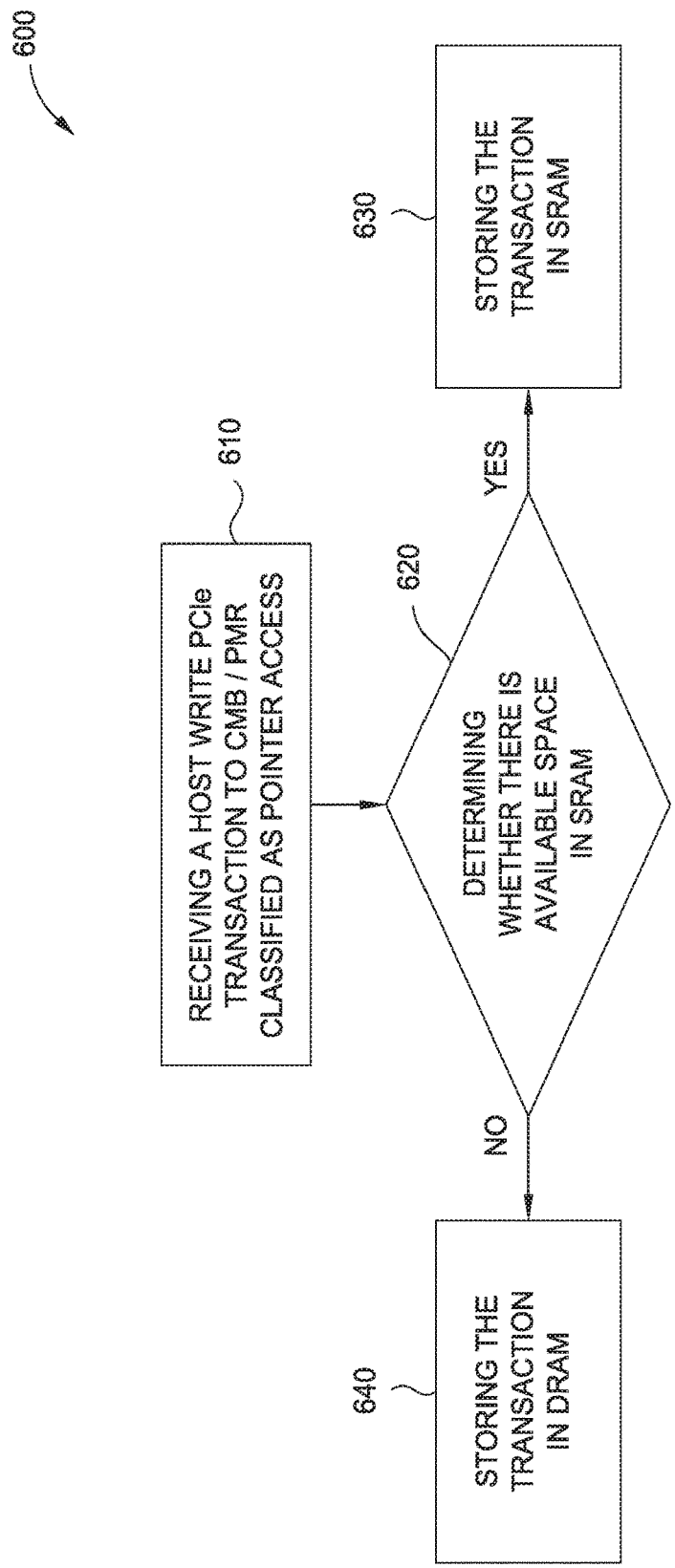
FIG. 6 is a schematic diagram illustrating of still another embodiment of a method of processing host write transactions to CMB/PMR to access a storage device.

FIG. 6 is a schematic diagram illustrating still another embodiment of a method 600 of processing host write transactions to CMB/PMR 250, 260 to access storage device 102. Method 600 will be described in reference to storage device 102 of FIG. 1 and controller buffer manager 120 of FIG. 2 although other systems and controller buffer managers may be utilized.

At process 610, a host write PCIe transaction from host 150 directed to CMB 250 or PMR 260 is classified by controller buffer manager 120 of storage device 102 as pointer access. The pointer access may be associated with a read command or a write command.

At process 620, controller buffer manager 120 determines whether there is available space in SRAM 112. If there is available space in SRAM 112, the host write transaction is stored in SRAM 112 at process 630. If there is not available space in SRAM 112, the transaction is stored in DRAM 111 at process 640.

Method 600 stores host write transactions classified as pointer access to available space in SRAM 112 since pointer transactions are small in size and consume a small amount of space in SRAM. If there is available space in SRAM 112, pointer transactions in SRAM may provide enhanced performance of controller buffer manager 120 without utilizing a large amount of space in SRAM 112.

Figure 7:
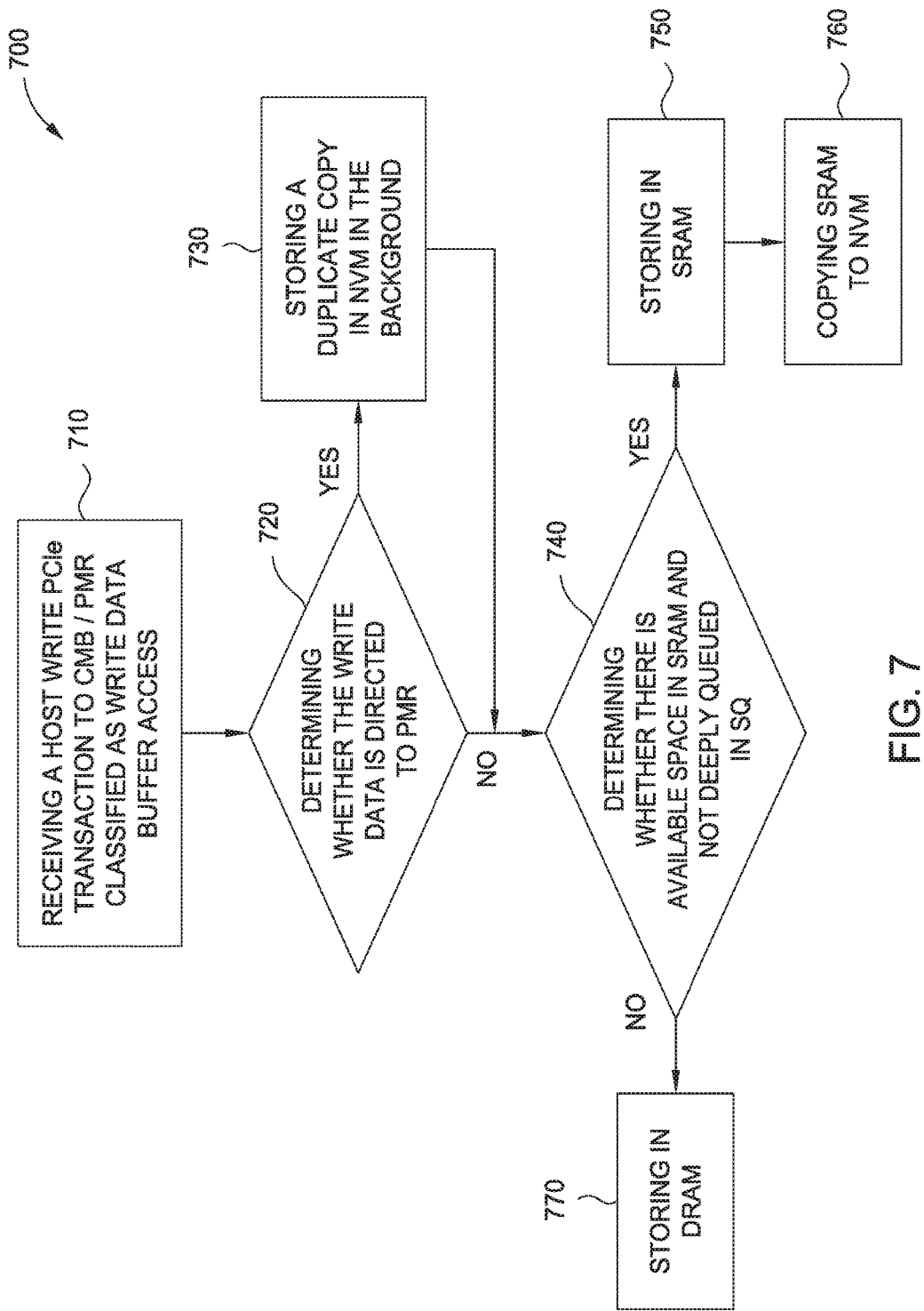
FIG. 7 is a schematic diagram illustrating of yet another embodiment of a method of processing of processing host write transactions to CMB/PMR to access a storage device.

FIG. 7 is a schematic diagram illustrating of yet another embodiment of a method 700 of processing host write transactions to CMB/PMR 250, 260 to access storage device 102. Method 700 will be described in reference to storage device 102 of FIG. 1 and controller buffer manager 120 of FIG. 2 although other systems and controller buffer managers may be utilized.

At process 710, a host write PCIe transaction directed to CMB 250 or PMR 260 is classified by controller buffer manager 120 as write data 234 buffer access.

At process 720, controller buffer manager 120 determines whether write data 234 is directed to PMR 260. If write data 234 is directed to PMR 260, then a duplicate copy of the write data 234 is stored to NVM 106 in a background operation. If there is a power cycle request, there is no need to perform an additional store operation since a duplicate copy of the host write transaction is already stored. Latency in PMR transactions may be reduced since copies of write data 234 are stored in NVM 106 in the background.

At process 740, controller buffer manager 120 determines whether there is available space in SRAM 112 and whether write data 234 is associated with a write command deeply queued in SQ 212. If write data 234 is associated with a write command that is not deeply queued in SQ 212, then write data 234 is store in available space in SRAM 112 at process 750. At process 760, whenever completing the execution of write command, write data 234 is copied to NVM 106 and released from SRAM 112. In certain embodiments, write data 234 is also copied to DRAM at process 760 to release the SRAM buffers since host 150 may issue PCIe memory read operations of write data 234.

If write data 234 is associated with a write command that is deeply queued in SQ 212 or there is no available space in SRAM 112, then write data 234 is stored in DRAM 111 at process 770. If write data 234 is deeply queued in SQ 212, then the associated write command must waited for the other prior commands in SQ 212 to be executed.

Method 700 provides for storing write data 234 in SRAM 112 if there is available space in SRAM 112 and if storage device 102 will execute the write command SQ 212 (i.e., the write command is at or near the head of SQ 212). Method 700 provides for enhanced size of CMB/PMR 250, 260 since the CMB/PMR 250, 260 spans across SRAM 112, DRAM 111, and NVM 102. Due to the selective utilization of SRAM 112, performance of controller buffer manager 120 may be similar or enhanced over CMB/PMR composed of only DRAM.

Embodiments of a storage device with CMB/PMR and method of accessing a storage device with CMB/PMR include classifying host NVMe commands into a NVMe data structure, such as NVMe queues, pointers, or data buffers. Based on the classification and along one or more other parameters, such as the availability of storage device controller SRAM, a controller buffer manager determines where to store each PCIe CMB/PMR transaction. For example, a PCIe CMB/PMR transaction may be stored in DRAM, SRAM, and NVM and combinations thereof.

In certain embodiments, the capacity of CMB/PMR may be increased since it spans across SRAM, DRAM, and NVM and CMB/PMR may be dynamically allocated between the memories. An increased capacity of CMB/PMR may be used to reduce the size of a host memory space. An increased capacity of CMB/PMR may be used to support multiple CMBs/PMRs initialized in a virtualization environment of storage device 102. The increased capacity of CMB/PMR may be supported without the need for a large ASIC area.

In certain embodiments, CMB/PMR performance is enhanced by using SRAM uses as a cache buffer for NVMe transactions.

While the foregoing is directed to embodiments of the present disclosure, other and further embodiments of the disclosure may be devised without departing from the basic scope thereof, and the scope thereof is determined by the claims that follow.

What is claimed is:

1. A method of accessing a storage device, comprising:
    receiving a host write transaction to a controller memory space containing one or more non-volatile memory express (NVMe) queues;
    determining whether an address of the host write transaction falls into the NVMe queues;
    in response to a determination that the address of the host write transaction falls into the NVMe queues, classifying the host write transaction as a NVMe queue access;
    determining whether the host write transaction is associated with a long burst;
    in response to a determination that the host write transaction is a long burst host write transaction, classifying the host write transaction as a NVMe data buffer access; and
    in response to a determination that the host write transaction is associated with a short data burst, classifying the host write transaction as a pointer access.

2. The method of claim 1, wherein the controller memory space comprises a SRAM, a DRAM, and a non-volatile memory.

3. The method of claim 2, further comprising storing the host write transaction into the SRAM, the DRAM, the non-volatile memory or combinations thereof based upon a classification as a NVMe queue access host write transaction, or a NVMe data buffer access transaction.

4. The method of claim 2, further comprising:
    determining whether there is space available in the SRAM for storing the host write transaction classified as pointer access;
    in response to a determination that there is space available in the SRAM, storing the host write transaction classified as pointer access to SRAM, and
    in response to a determination that there is not space available in the SRAM, storing the host write transaction classified as pointer access to the DRAM.

5. The method of claim 1, wherein the host write transaction is directed to a controller memory buffer (CMB) of the controller memory space.

6. The method of claim 1, wherein the host write transaction is directed to a persistent memory region (PMR) of the controller memory space.

* * * * *